Patented July 11, 1933

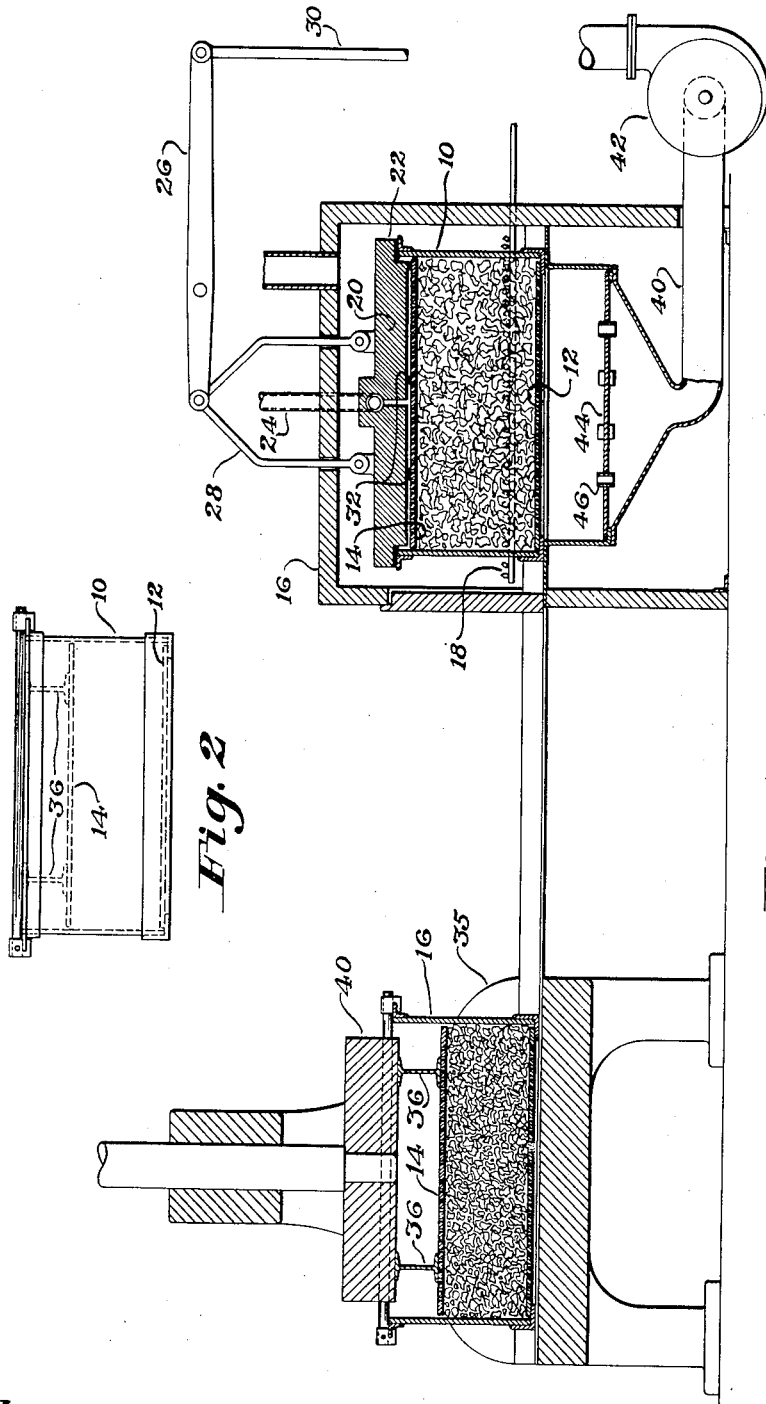

1,917,361

UNITED STATES PATENT OFFICE

RALPH P. CHAMPNEY, OF DEARBORN, MICHIGAN, ASSIGNOR TO MITCHELL & SMITH, INCORPORATED, OF DETROIT, MICHIGAN, A CORPORATION OF MASSACHUSETTS

METHOD OF PRODUCING CORK BOARD

Application filed May 16, 1930. Serial No. 452,921.

The present invention relates to a process and apparatus for the production of molded blocks or sheets of artificial cork.

According to the present invention cork granules are charged into a mold or similar receptacle, heated in a non-oxidizing atmosphere to a temperature sufficient to liberate resinous materials and volatile matter in the cork granules, and thereafter, before cooling, are subjected to substantial pressure for the purpose of condensing the mass of cork granules in an amount determined by the final desired density of the block or sheet.

I prefer, in carrying out my invention, to pass steam through the comparatively loose mass of granules, and simultaneously maintain the receptacle or mold at the desired temperature through exterior heat, as by placing the mold in an oven. At the completion of the heating operation and while the mass is still hot, I remove the mold containing the heated cork from the oven, and convey the mold to a press where substantial pressure may be exerted upon the cork mass for the purpose of imparting the desired final density to it.

Inasmuch as the temperatures employed for accomplishing the desired conversion of the corkboard may be on the order of 350° F. or greater, I find it desirable to prevent substantial access of air to the mass of heated cork, at least prior to the point at which substantial cooling has been effected. In ordinary practice this purpose is reasonably well accomplished by leaving the mass of cork in the mold protected at the bottom and top by the perforated plates through which the steam passes during the heating period. If desirable, especially during the period intervening between the removal of the cork mass from the oven and its compression to the desired final density, further precautions in the nature of wet blankets of suitable material covering the top of the mold may be employed for smothering the space within the mold, preventing circulation of air therethrough.

As will be evident, my method contemplates the charging of the cork wood in the form of loose granules into a suitable receptacle, the heating of the granules in the loose, uncompressed condition to a sufficient temperature and for a sufficient period of time to accomplish the desired conversion, and thereafter without removal of the heated cork mass from the receptacle, subjecting the mass while still hot to a predetermined pressure of sufficient amount to compress the mass to the required final density. This method has several advantages in comparison with other and known methods. The heating of the cork mass, free from substantial compression, facilitates the uniform distribution of steam throughout the mass, and effects not only a saving in time but an improvement in uniformity of cooking throughout the mass of cork. The compression of the mass within the same receptacle permits an accurate determination of the final desired density, and a variation of this density when desired without altering or in any way affecting the prior cooking operation.

After compression of the mass, it is positively maintained in compressed condition until after it has set and cooled sufficiently to permit its safe removal from the mold and exposure to the atmosphere.

In the accompanying drawing,

Fig. 1 represents a side elevation of the apparatus partially in section; and

Fig. 2 represents the mold with a charge of cork retained therein under pressure after heating.

According to one form of my process which is conceivably adapted for the production of commercial sizes of block, I may charge cork wood in the form of granules into a mold 10, provided with a perforated bottom plate 12. After the mold has been sufficiently filled with the cork granules, the comparatively light perforated top plate 14 is assembled within the mold for the dual purpose of properly distributing steam throughout the mass of cork during the heating operation, and for substantially excluding air from the cork mass subsequent to and during the pressing operation. The perforated top plate is of insufficient weight to place any substantial pressure upon the mass of cork. In fact, such pressure is undesirable, as it hampers and interferes with the flow of steam therethrough, and otherwise accomplishes no useful purpose.

The mold 10 charged with the desired amount of cork granules is next introduced into an oven 16 of conventional form, capable of being heated to the desired temperature by gas burners 18 in the lower portion. Supported in the oven in position to be assembled with the upper portion of the mold is a steam head 20, having a shouldered portion 22 which fits the top of the mold and provides a substantial seal therefor. Steam under suitable pressure and temperature is delivered to the head through an inlet pipe 24, permanently connected therewith. As indicated, the steam head may be conveniently raised and lowered into operative position by an overhead pivoted lever 26, supporting the steam head through a link or equivalent connection 28, raising and lowering of the opposite end of the lever through the connection 30 serving to accomplish the desired movements of the steam head. The steam head is preferably provided with longitudinal distributing grooves 32, which communicate with the uniformly spaced perforations in the top plate for the purpose of insuring an adequate and thorough penetration of the cork mass thereby. It will be evident from an inspection of the drawing that when the mold 10 is inserted within the oven, the perforated top plate 14 is located at a sufficient distance below the top of the mold to afford clearance between the top plate and the steam head 20 so that the weight of the steam head is not superimposed upon the mass of cork but is borne by the mold itself upon which the head rests. The steam head is desirably of sufficient weight to maintain its position in sealing contact with the mold should the pressure, due to the expansion of the cork mass in heating, tend to lift it. In other words, this weight should be sufficient to resist the expansion of the cork mass in heating sufficiently to maintain sealing engagement. In ordinary practice, the mold 10 is first filled with cork granules to a definite gauge mark, and the top plate laid thereover, this fill allowing sufficient clearance to permit subsequent expansion of the cork mass in heating without displacing or removing the steam head from sealing position.

According to the best practice with which I am now familiar, it is desirable to maintain the oven temperature through the gas heating or equivalent means at temperatures of 400 to 450° F. or thereabouts, although these exact temperatures are not essential to the operation and may be altered as experience proves desirable. In addition, the superheated steam is delivered to the cork mass through the steam head and connected pipes at a pressure of eight pounds or thereabouts and a temperature of 375° or somewhat greater. The lower portion of the mold when located within the oven communicates directly with an exhaust duct 40 which is connected with a suitable exhaust fan or blower 42 operated in a manner to produce a vacuum in the exhaust duct. This vacuum serves to facilitate the passage of the superheated steam through the cork mass, and accomplish a uniform and desirable heating and conversion of the mass as a whole. If so desired, distribution of the steam may be further improved by the provision of a baffle plate 44 located in the exhaust duct below the perforated bottom plate and having perforations 46 about the outer periphery, the exact number and location of these perforations being varied somewhat as experience dictates to secure the best distribution. With this construction and arrangement I have found that the desired conversion of the cork mass may be accomplished in a period of forty to fifty minutes, approximately, although further experience may indicate that slight alteration in the pressure of the steam and the amount of suction may permit the conversion to be effected in a shorter period of time. Furthermore, it may be desirable to cut off or interrupt passage of superheated steam after an interval less than the total interval, and to thereafter complete the operation with saturated steam at materially lower temperatures although such a method is not now employed and does not appear to be necessary from the standpoint of improving the process. With the process carried out as above described, the cork mass is properly converted as indicated, by its bonding qualities and resultant color, and if immediately conveyed while still in the mold to a suitable type of press, may be compressed to the final density while still hot and before the liberated resinous matter has set.

At the completion of the heating operation, the steam head is disconnected and the mold with the perforated top and bottom plates in place is immediately transferred to a press, which may be of conventional form as indicated at 35, and subjected through the top plate to a pressure necessary to condense the cork mass. This is conveniently accomplished by placing over the perforated plate a cribbing of angles or channel sections 36, which are adapted to receive the thrust of the pressure head 40 and condense the cork mass an amount determined by the use to which it is to be put. After the proper condensing of the mass to the desired point, the top plate is locked in position until the mass is cooled sufficiently to permit its removal from the mold. This I accomplish in a simple and effective manner by providing locking bars which are assembled with the mold and locked to opposite edges of the mold, the locking bars engaging with the tops of the channel sections 36, as indicated in the drawing.

Thereafter the mold with the cork mass locked in compressed position is allowed to cool until the temperature of the mass has been substantially reduced to a point permitting safe removal of the mass and exposure to atmospheric air. I find it desirable to maintain the mass within the mold until it has cooled exteriorly to a temperature well below 300° F. Although this cooling of the mass may be carried out naturally at room temperatures, it may be desirable and expedient to artificially hasten the cooling and thus reduce the period of time during which the cork mass is confined to the mold and in consequence release the mold for the production of a second batch in a lesser period of time.

In actual practice, according to my method, it is possible to satisfactorily produce blocks of such a size that the finished product after trimming will be relatively 10 to 11 inches in thickness, 25 inches wide and 37 inches long. The dimensions of such a block satisfactorily meet the demands of commercial usage, and permit the block to be cut either into thick slabs or thinner sheets, depending on the purpose for which it is to be used.

The density of the material varies, dependent upon whether it is to be employed as insulation, isolation or tiling. In employing the cork board as insulation, the density per board foot may vary from 1/10 of a pound to one pound per board foot. In employing the material for isolation, the density may vary from one pound or 1.1 pounds up to two pounds per board foot, and in employing the material as tiling, the density should approximate two pounds per square foot. It will be evident that the density of the finished material may be varied as desired, dependent on the purpose for which it is to be employed. It will furthermore be evident that the density may be even less than that indicated, for example, as small as one-half a pound per board foot if necessary.

Obviously certain modifications of the disclosed apparatus might be made without altering the intended function and purpose of the present invention. For example, the cork board might conceivably be produced in a continuous process by heating the mass of cork, as described, in a receptacle without substantial pressure, continuously removing the cork from the receptacle with a screw conveyor, forcing it through a mold of circular or rectangular cross-section under the requisite pressure, and continuously extruding the molded cork mass from the opposite end of the mold after cooling had been accomplished, or conceivably extruding the cork bar into a non-oxidizing atmosphere in which cooling was accomplished. In either case it will be evident that the major and underlying principles of my process are in evidence, namely, the requisite heating of the cork mass with the combined action of external heat and steam without the creation of substantial pressure, with the subsequent exertion of a predetermined pressure upon the heated mass determined by the desired final density, and permissibly varied for this purpose, followed by a rigid maintenance of the mass in the compressed stated until cooling has sufficiently progressed to permit removal of the mass from the mold. Inasmuch as the delayed cooling action is caused principally, if not entirely, by the depth and thickness of the mass and the slow rate of cooling of the interior, it may be desirable under certain circumstances, as where the block is to be slabbed or cut into sheets, to initially expose the interior immediately upon removal from the pressure mold, and before cooling, in a non-oxidizing atmosphere, sever the block in a manner to expose the interior, and thus materially hasten the cooling period.

What is claimed is:

1. The process of treating cork which consists in loading a receptacle with a loose mass of cork granules, passing steam through the mass while maintained in a comparatively pressure-free condition with air excluded therefrom to heat the mass for the liberation of natural resins, cutting off the flow of steam after the completion of heating to 350° F. or more, subsequently, without removal of the cork mass from the receptacle and without permitting substantial access of air thereto, subjecting the hot mass of cork to definite compression for the purpose of producing a predetermined volume and density, and finally cooling the hot compressed mass while maintaining the mass in the receptacle in a condition of reduced volume.

2. The process of producing artificial cork which comprises loading a receptacle with a loose mass of cork granules, externally heating the receptacle and simultaneously passing steam through the mass while maintained in a comparatively pressure-free condition with air excluded therefrom to heat the mass for the liberation of natural resins, cutting off the flow of steam and discontinuing the external heating of the receptacle after the completion of heating to 350° F. or more, thereafter, without removal of the cork mass from the receptacle and without permitting substantial access of air thereto, subjecting the hot mass of cork particles to definite compression to reduce the cork mass to the predetermined volume and density, and cooling the hot compressed mass while maintaining the mass in the receptacle in a condition of reduced volume.

RALPH P. CHAMPNEY.